(12) United States Patent
Sikka et al.

(10) Patent No.: US 8,863,115 B2
(45) Date of Patent: *Oct. 14, 2014

(54) EXECUTION OF PROGRAM CODE HAVING LANGUAGE-LEVEL INTEGRATION OF PROGRAM MODELS

(75) Inventors: Vishal Sikka, Los Altos Hills, CA (US); Matthias Gerhard Anlauff, San Jose, CA (US)

(73) Assignee: SAP AG, Walldorf (DE)

( * ) Notice: Subject to any disclaimer, the term of this patent is extended or adjusted under 35 U.S.C. 154(b) by 1629 days.

This patent is subject to a terminal disclaimer.

(21) Appl. No.: 12/052,590

(22) Filed: Mar. 20, 2008

(65) Prior Publication Data

US 2009/0241094 A1 Sep. 24, 2009

(51) Int. Cl.
*G06F 9/445* (2006.01)
*G06F 9/44* (2006.01)

(52) U.S. Cl.
CPC .................................... *G06F 8/31* (2013.01)
USPC ............................................ 717/177; 717/175

(58) Field of Classification Search
None
See application file for complete search history.

(56) References Cited

U.S. PATENT DOCUMENTS

| | | | | |
|---|---|---|---|---|
| 5,734,907 | A * | 3/1998 | Jarossay et al. | 717/141 |
| 5,740,351 | A * | 4/1998 | Kasten | 714/35 |
| 5,875,334 | A * | 2/1999 | Chow et al. | 717/141 |
| 6,067,413 | A | 5/2000 | Gustafsson et al. | |
| 6,243,668 | B1 | 6/2001 | Le | |
| 6,425,119 | B1 | 7/2002 | Jones et al. | |
| 6,820,255 | B2 | 11/2004 | Babaian | |
| 7,406,683 | B2 | 7/2008 | Kalidindi et al. | |
| 7,562,339 | B2 | 7/2009 | Racca et al. | |
| 7,627,594 | B2 | 12/2009 | Meijer et al. | |
| 7,681,184 | B1 | 3/2010 | Weedon et al. | |
| 7,703,088 | B2 | 4/2010 | Li et al. | |
| 7,721,254 | B2 | 5/2010 | Relyea et al. | |
| 7,761,856 | B2 * | 7/2010 | Griffin | 717/137 |
| 7,802,238 | B2 | 9/2010 | Clinton | |
| 8,032,860 | B2 | 10/2011 | Piehler et al. | |
| 8,533,672 | B2 | 9/2013 | Anlauff et al. | |
| 8,533,673 | B2 | 9/2013 | Anlauff et al. | |

(Continued)

FOREIGN PATENT DOCUMENTS

WO WO-20090625727 A1 5/2009

OTHER PUBLICATIONS

Anlauff, M. Anlauff et al., "Formal Aspects of and Development Environments for Montages," 2nd International Workshop on the Theory and Practice of Algebraic Specifications, Amsterdam 1997.

(Continued)

*Primary Examiner* — Jason Mitchell
(74) *Attorney, Agent, or Firm* — Schwegman Lundberg & Woessner, P.A.

(57) ABSTRACT

To enable language-level integration of multiple programming languages into a single programming framework, one or more domain specific languages (DSLs) are specified as incremental extensions to a host programming language. An application created in this framework may include program code written in the host language as well as DSL inset code that is written in any of the DSLs. The extensions to the host language are described in DSL specifications, which define how the DSL inset code is processed. At runtime, DSL inset code in the source code is detected and passed to a DSL inset processor for execution according to an appropriate DSL specification, whereas source code in the host language is executed by a host language processor.

17 Claims, 6 Drawing Sheets

(56) References Cited

U.S. PATENT DOCUMENTS

| | | | |
|---|---|---|---|
| 2002/0059563 A1 | 5/2002 | Pavlovic et al. | |
| 2003/0037312 A1 | 2/2003 | Czech | |
| 2003/0046665 A1* | 3/2003 | Ilin | 717/126 |
| 2003/0188300 A1* | 10/2003 | Patrudu | 717/149 |
| 2004/0088688 A1* | 5/2004 | Hejlsberg et al. | 717/143 |
| 2004/0143823 A1 | 7/2004 | Wei | |
| 2004/0261065 A1 | 12/2004 | Abrams et al. | |
| 2005/0091575 A1 | 4/2005 | Relyea et al. | |
| 2005/0108682 A1 | 5/2005 | Piehler et al. | |
| 2006/0053138 A1 | 3/2006 | Meijer et al. | |
| 2006/0080635 A1 | 4/2006 | Anwar et al. | |
| 2006/0080648 A1 | 4/2006 | Anwar et al. | |
| 2006/0218538 A1 | 9/2006 | Van Kesteren | |
| 2006/0248466 A1 | 11/2006 | Fedorenko et al. | |
| 2007/0044066 A1* | 2/2007 | Meijer et al. | 717/100 |
| 2007/0055964 A1 | 3/2007 | Mirkazemi et al. | |
| 2007/0226708 A1 | 9/2007 | Varma | |
| 2007/0239766 A1 | 10/2007 | Papaefstathiou et al. | |
| 2008/0295070 A1 | 11/2008 | Bozza et al. | |
| 2009/0007084 A1 | 1/2009 | Conallen et al. | |
| 2009/0064091 A1 | 3/2009 | Tonkin | |
| 2009/0241090 A1 | 9/2009 | Anlauff et al. | |
| 2009/0241091 A1 | 9/2009 | Anlauff et al. | |
| 2010/0088686 A1* | 4/2010 | Langworthy et al. | 717/143 |
| 2010/0269094 A1 | 10/2010 | Levenshteyn et al. | |

OTHER PUBLICATIONS

Anlauff, M. et al., "Domain-Specific Languages in Software Architecture," Integrated Design and Process Technology, IDPT99, IEEE International Conference on Systems Integration, Dallas, Jun. 2000.

Anlauff, M., "Xasm—An Extensible, Component-Based Abstract State Machines Language," Proceedings of the ASM 2000 Workshop, Lecture Notes in Computer Science, vol. 1912, Springer, 2000.

Sikka, V., "Integrating Specialized Procedures into Proof Systems," Ph.D., Nov. 1996 from Stanford University.

"U.S. Appl. No. 12/052,583, Examiner Interview Summary mailed Apr. 26, 2012", 14 pgs.

"U.S. Appl. No. 12/052,583, Examiner Interview Summary mailed Nov. 23, 2011", 3 pgs.

"U.S. Appl. No. 12/052,583, Final Office Action mailed Jan. 26, 2012", 18 pgs.

"U.S. Appl. No. 12/052,583, Non Final Office Action mailed Jun. 22, 2012", 25 pgs.

"U.S. Appl. No. 12/052,583, Non Final Office Action mailed Aug. 17, 2011", 14 pgs.

"U.S. Appl. No. 12/052,583, Response filed Apr. 20, 2012 to Final Office Action mailed Jan. 26, 2012", 12 pgs.

"U.S. Appl. No. 12/052,583, Response filed Oct. 22, 2012 to Non Final Office Action mailed Jun. 22, 2012", 11 pgs.

"U.S. Appl. No. 12/052,583, Response filed Nov. 17, 2011 to Non Final Office Action mailed Aug. 17, 2011", 12 pgs.

"U.S. Appl. No. 12/052,601, Examiner Interview Summary mailed Apr. 27, 2012", 3 pgs.

"U.S. Appl. No. 12/052,601, Examiner Interview Summary mailed Nov. 28, 2011", 3 pgs.

"U.S. Appl. No. 12/052,601, Final Office Action Mailed Jan. 20, 2012", 16 pgs.

"U.S. Appl. No. 12/052,601, Non Final Office Action mailed Jun. 21, 2012", 22 pgs.

"U.S. Appl. No. 12/052,601, Non Final Office Action mailed Aug. 17, 2011", 12 pgs.

"U.S. Appl. No. 12/052,601, Response filed Apr. 20, 2012 to Final Office Action mailed Jan. 20, 2012", 10 pgs.

"U.S. Appl. No. 12/052,601, Response filed Oct. 22, 2012 to Office Action mailed Jun. 21, 2012", 10 pgs.

"U.S. Appl. No. 12/052,601, Response filed Nov. 17, 2011 to Non Final Office Action mailed Aug. 17, 2011", 10 pgs.

"U.S. Appl. No. 12/052,601, Notice of Non-Compliant Amendment mailed Oct. 26, 2012", 3 pgs.

"U.S. Appl. No. 12/052,601, Response filed Nov. 19, 2012 to Notice of Non-Compliant Amendment mailed Oct. 26, 2012", 11 pgs.

"U.S. Appl. No. 12/052,583 , Response filed Apr. 23, 2013 to Final Office Action mailed Jan. 22, 2013", 11 pgs.

"U.S. Appl. No. 12/052,583, Examiner Interview Summary mailed May 1, 2013", 3 pgs.

"U.S. Appl. No. 12/052,583, Final Office Action mailed Jan. 22, 2013", 24 pgs.

"U.S. Appl. No. 12/052,583, Notice of Allowance mailed May 8, 2013", 12 pgs.

"U.S. Appl. No. 12/052,601, Examiner Interview Summary mailed May 1, 2013", 3 pgs.

"U.S. Appl. No. 12/052,601, Final Office Action mailed Jan. 18, 2013", 22 pgs.

"U.S. Appl. No. 12/052,601, Notice of Allowance mailed May 7, 2013", 12 pgs.

"U.S. Appl. No. 12/052,601, Response filed Apr. 18, 2013 to Final Office Action mailed Jan. 18, 2013", 10 pgs.

"Domain-Specific Language Embedding and Assimilation without Restrictions-Martin Bravenboer", Concrete Syntax for Objects Eelco Visser-Institute of Information and Computing Sciences Universiteit Utrecht, (Aug. 17, 2004).

* cited by examiner

```
 1  function process(input_spec, binding_context, is_filename) {
 2    // set the input string according to the is_filename flag
 3    input_string = if is_filename then
 4                       <contents of file input_spec>
 5                   else
 6                       input_spec
 7                   end
 8    // determine the list of DSL candidates for the given input string
 9    lang_list = <sorted list of names of registered DSLs>
10    forall lang in lang_list do
11      try
12        // check whether a Ruby class with the language name exists and,
13        // if yes, create an object of that class
14        langobj = <create instance of class lang>
15        // if defined, set the evaluation context of the language object
16        // to the one given as parameter; this makes it possible for
17        // DSL code to refer to local variables in the caller
18        if langobj.respond_to("eval_context=")
19            langobj.eval_context = binding_context
20        end
21        // now, call the "parse" method on the langobj with
22        // the input string as argument:
23        result = langobj.process(input_string)
24        // if the control gets here it means that the processing of
25        // the input string was successful, so we can return the result:
26        return result;
27      catch exception
28        // all exceptions are caught, so that multiple languages
29        // can be tried in case the first ones on the list fail
30        // for the given input string
31        <skip to next loop iteration>
32      end
33    enddo
34    // if the code gets here, no DSL has been found for the input string
35    raise NoLanguageFoundException
36  }
```

FIG. 4

```
class MyDSL
macro
  BLANK         \s+
rule
# literal
              \"[^"]*\"        { [:string, text] }  # "
              \'[^']\'         { [:character, text] }  # '
# skip
    {BLANK}       # no action
    \#.*          # no action symbols
       \;            { [:semicolon, text] }
       \,            { [:comma,       text] }
     \:=             { [:assign,      text] }
       ==            { [:cmp_eq,      text] }
       >=            { [:cmp_ge,      text] }
       <=            { [:cmp_le,      text] }
# number
       \d+\.\d+           { [:number,         text.to_f] }
       \d+                { [:number,         text.to_i] }
# identifier and keywords
       \w+ {
          token = case text
                when 'End'    then :kw_end
                when 'end'    then :kw_end
                when 'is'     then :kw_is
                when 'or'     then :kw_or
                when 'and'    then :kw_and
                when 'with'   then :kw_with
                when 'sets'   then :kw_sets
                when 'String' then :kw_string
                when /^[A-Z]/
                   token = :capident
                else
                   token = :ident
                end
          [token,text]
       }
end
```

EXECUTION OF PROGRAM CODE HAVING LANGUAGE-LEVEL INTEGRATION OF PROGRAM MODELS

CROSS REFERENCE TO RELATED APPLICATIONS

This application is related to U.S. application Ser. No. 12/052,601, entitled "Language-Level Integration of Programming Models," filed Mar. 20, 2008, and issued Sep. 10, 2013, as U.S. Pat. No. 8,533,673, and to U.S. application Ser. No. 12/052,583, entitled "Extending the Functionality of a Host Programming Language," filed Mar. 20, 2008, and issued Sep. 10, 2013, as U.S. Pat. No. 8,533,672, each of which is incorporated by reference in its entirety.

BACKGROUND

This invention relates generally to computer software, and in particular to a programming framework that integrates multiple programming models at the language level.

Enterprise applications are typically built using a collection of different programming models and languages. The integration of a number of different programming models and languages is a significant task in the development process. In fact, developing large-scale enterprise applications has largely become an exercise in plugging together existing software components rather than writing low-level program code or models for individual components. Since many of the components in enterprise applications live in different domains and are written in different programming languages using different libraries, building enterprise applications requires designers to overcome the programming language barrier and to translate the programming models from one domain to another.

The use of different programming models and languages beneficially allows developers to select the most appropriate tools for a particular problem domain (e.g., SQL for database management, or Java for user interfaces). However, this also results in a collection of "design" times that are executed using a set of corresponding containers or runtimes. As a result, each programming model or language and its corresponding runtime becomes a distinct silo, each silo having its own tightly integrated tool set. With many different models and languages and the corresponding different runtimes, the software may suffer from problems such as semantic mismatches and the failure of languages and models to work well together.

During the design of the software, the complications that arise from the use of multiple tools and models for different parts of the application may manifest in the form of significantly lower developer efficiency and increased cost of development. Developers end up serving as the glue between these languages and models, and a lot of programming time and other design effort may be spent on translating between the different layers and models in the software (e.g., reading SQL data into the business logic and constructing user interface and generating reports from the results of the business logic).

During runtime of the software, the disparate silos may cause a lack of runtime optimization. As mentioned, different containers may be used to run different models and languages (such as SQL databases to execute SQL, or analytical servers for analytics). Each container is typically optimized for specialized language, but the interoperation of containers at runtime and the overall optimization of the software are ignored. This causes significant landscape complexity and increases the costs of running the application.

In existing programming models, one portion of an application's code (e.g., a silo) may use the functionality of another portion by calling on predefined functions that are written in a different programming model or language. To call functions that are written in another programming language, for example, a program may make a specific call to an API or function from a predefined library. This method of integrating code written in different silos is clunky and inefficient. It requires the program to pass data across the silos as variables to the desired function calls, and it adds a set of function calls that the programmer must learn in addition to the programming language itself.

Accordingly, a new programming framework is needed for dealing with these issues in the development of software applications that incorporate multiple programming models and/or languages, such as large-scale enterprise applications. It would be desirable for the new framework to maintain the autonomy of the different programming models and languages, while capturing these differences in a platform that seamlessly integrates the different models and languages at language level.

SUMMARY

To enable language-level integration of multiple programming languages while avoiding many of the drawbacks of previous programming methodologies, embodiments of the invention integrate into a host language one or more other programming languages that are specified as incremental extensions to the host language. The host language provides constructs to specify language extensions that become part of the host language, and the host language provides access to its own language constructs. Extending the functionality of a host language in this way allows software developers to write program code using multiple languages in an integrated fashion and without having to resort to external function calls.

The benefits of language-level integration of program code may be experienced at design time as well as runtime. During design of an application, for example, this integration may greatly simplify design time of a software application, allowing programmers to switch among multiple languages during the coding process depending on the needs of the software. During runtime, this integration breaks down the barriers that existed between portions of program code written in different languages. With these barriers eliminated, optimization techniques can be applied across the code written in different programming languages, thus enabling even more efficient operation of the application. Embodiments of the invention also provide a flexible framework that is extensible and can easily incorporate new developments in programming principles. A new development, such as a new programming language, may simply be defined as a new extension to the host language, thereby incorporating the functionalities of the new language into the integrated programming model.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Language-Level Integration Approach

Embodiments of the invention integrate multiple programming languages into a single programming model at the language level. Programming languages are referred to herein as domain-specific languages (DSLs), since programming languages may be designed or specially suited for a particular application or problem domain. However, this term is not meant to be limiting as to any type or category of programming language, and a DSL may comprise any programming language or portion thereof, whether general in nature or designed for a specific application only. The language-level integration of multiple DSLs may be accomplished by extending the functionality of a first DSL, referred to herein as the host language, where one or more other DSLs are incorporated as native constructs of the host language. Accordingly, the host language itself is a DSL, but it also provides for the native programming environment into which the other DSLs are to be incorporated.

In one embodiment, the programming language selected to be the host language is one that is accessible to most programmers but also rich with features. Preferably, the host language is reflective and allows non-native constructs from several different programming languages to be semantically and syntactically integrated into the host language. One language that may be well suited for the host language in certain implementations is the Ruby programming language, which is a reflective, interpreted programming language. Depending on their features, however, various other programming languages may be selected as the host language.

Once the host language is determined, key programming models and languages can be added to the host language as one or more extensions to the host language. The DSLs to be incorporated into the host language depend on the functionalities that are desired. For example, if the new programming framework will be used to manage data, then SQL may be incorporated to the host language as a DSL. If the framework will be used to create a user interface, a language having user interface tools such as Java may be incorporated. In one embodiment, any number of DSLs can be defined as extensions into the host language on the fly, thereby giving the framework the flexibility to define and incorporate new DSL extensions into the host language as they are desired.

Figure 1:
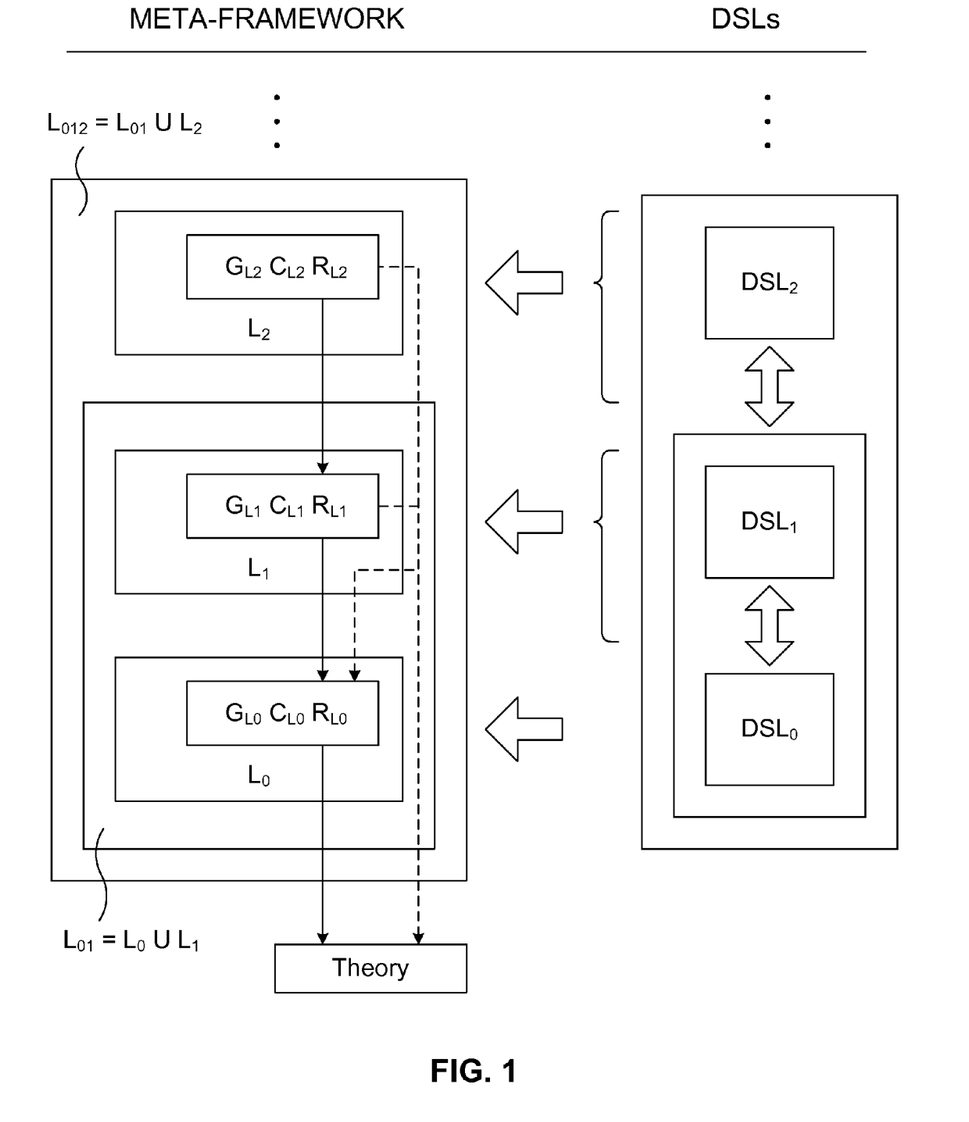
FIG. 1 is a diagram of a programming meta-framework that incorporates multiple programming languages, in accordance with an embodiment of the invention.

FIG. 1 is a conceptual diagram showing the relationship between a set of DSLs and a meta-framework for integrating them into the host language at the language level. In this example, the host language is designated $DSL_0$, and the DSLs being incorporated are designated $DSL_1$, $DSL_2$, and so on. Each of the DSLs correspond to a particular programming language in the meta-framework.

As shown, each programming language L can be described by a syntax definition $G_L$, a set of static semantics conditions $C_L$, and a set of execution rules $R_L$. The syntax definition may be expressed in form of grammar production rules, which transform a text string into an abstract syntax tree (AST) using the production rules of grammar. The static semantics enforce consistency rules on an AST, checks the consistency of the AST (e.g. typing) using a set of conditions C and possibly modifying the AST using inference techniques. The execution rules are enforced by dynamic conditions on nodes of the AST, translating ASTs into formulas of a theory using the execution rules.

In the example integrated model of FIG. 1, $DSL_1$ is first integrated into the host language, $DSL_0$. This results in a combined programming language $L_{01}$, which is the union of host language $L_0$ and the language extension $L_1$ corresponding to $DSL_1$. The process of integrating DSLs into the host language, described in more detail below, can be repeated for additional DSLs. For example, a second language extension $L_2$ is integrated to form $L_{012}$, the union of $L_2$ and the combined language $L_{01}$. The languages extensions are integrated into the host language in a semantically sound manner, where the semantics of the host language are described in a well-founded theory and all extensions are based on that theory. As can be appreciated, this method is flexible and scalable, as the framework can be extended by any number of DSLs and is not limited to the ones initially identified. For example, the framework may also allow for application-specific languages (i.e., a language that hard-codes application logic and data into a language) to be integrated into the framework in the same way that DSLs are integrated.

Runtime Environment

Figure 2:
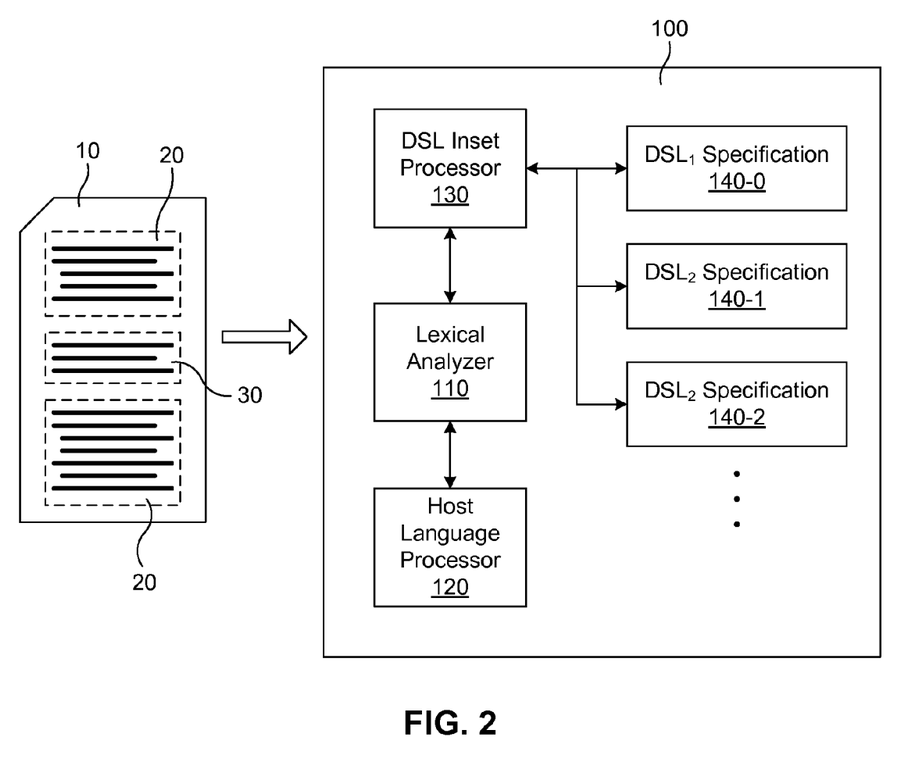
FIG. 2 is a diagram of a system for processing code having language-level integration of multiple programming languages, in accordance with an embodiment of the invention.

FIG. 2 illustrates a runtime environment for an embodiment of a system 100. The system 100 is designed to execute program code that contains language-level integration of multiple programming languages. The system 100 comprises a lexical analyzer 110, a host language processor 120, a DSL inset processor 130, and one or more DSL specifications 140. The lexical analyzer 110 and host language processor 120 may comprise any standard parser and interpreter for the host language, with some additional logic added to the lexical analyzer 110 for detecting and processing program code that is written in a DSL. Each of the components of the system may be implemented as a module of computer instructions stored on a computer-readable medium, and the system may comprise a computer system designed to process those instructions. Various configuration are well known in the art. In one embodiment, the system 100 is configured to process source code from a single-pass interpreted language, such as the Ruby programming language.

The system 100 is designed to receive and process a source code file 10. The source code file 10 may comprise program code 20 written in the host language as well as one or more DSL insets 30, or portions of program code written in a DSL extension of the host language. The program code 20 in the host language and the DSL insets 30 are integrated at the language level, rather than across silos of compiled program code. In this way, the system 100 may read and process each line of code in the source code file 10 regardless of the particular language in which the code was written, whether the host language or some other DSL.

FIG. 2 illustrates one embodiment of a method for processing the source code file 10 using system 100. In this method, the lexical analyzer 110 receives 210 the program code from the source code file 10. The lexical analyzer 110 analyzes 220 the next line of code from the source code file 10 to determine how to process the code. It can be appreciated that the portion of code analyzed 220 may be more or less than a single line of code. In one example, there are two possible alternate branches for processing the line of code, depending on whether the portion of the program code to be processed contains a DSL inset 30. Accordingly, the lexical analyzer 110 detects 230 whether the line of code contains a DSL inset 30. Various techniques for detecting a DSL inset 30 in the source code file 10 are described in more detail below.

If the line of code being processed does not contain a DSL inset 30, and instead contains only code written in the host language, the lexical analyzer 110 passes this code to the host language processor 120. The interpreter then executes 240 the line of code in the host language according to any well known technique for executing program code of the host language. For example, if the host language is Ruby, then the interpreter may comprise a standard Ruby interpreter that executes the Ruby code according to known techniques. Once the line of code is executed 240, control then returns to the lexical analyzer 110, which analyzes 220 the next line of code in the source file 10.

If the lexical analyzer 110 does detect 230 a DSL inset 30 in the code being analyzed, the lexical analyzer 110 instead passes the DSL inset 30 as a text string to the DSL inset processor 130, which then processes the DSL inset 30 in accordance with embodiments of the invention. As illustrated, the DSL inset processor 130 may first select 250 a DSL specification 140 that corresponds to the programming language in which the DSL inset 30 was written. Using this DSL specification 140, the DSL inset processor 130 then executes 260 the DSL inset code 30. In one embodiment, the DSL specification 140 contains instructions for parsing the DSL inset 30 and returning a result of the DSL inset 30 according to the rules of the corresponding DSL. Embodiments for processing a DSL inset 30 using a DSL specification 140 are described in more detail below. Once the DSL inset 30 is executed 260, control then returns to the lexical analyzer 110, which analyzes 220 the next line of code in the source file 10.

In one embodiment, one DSL may be integrated into the programming framework by defining that DSL with respect to another DSL, instead of the host language. In such a case, the parsing method defined in one DSL specification 140 may invoke another DSL specification, so control may be passes between DSL specifications in the procedure described above.

Figure 3:
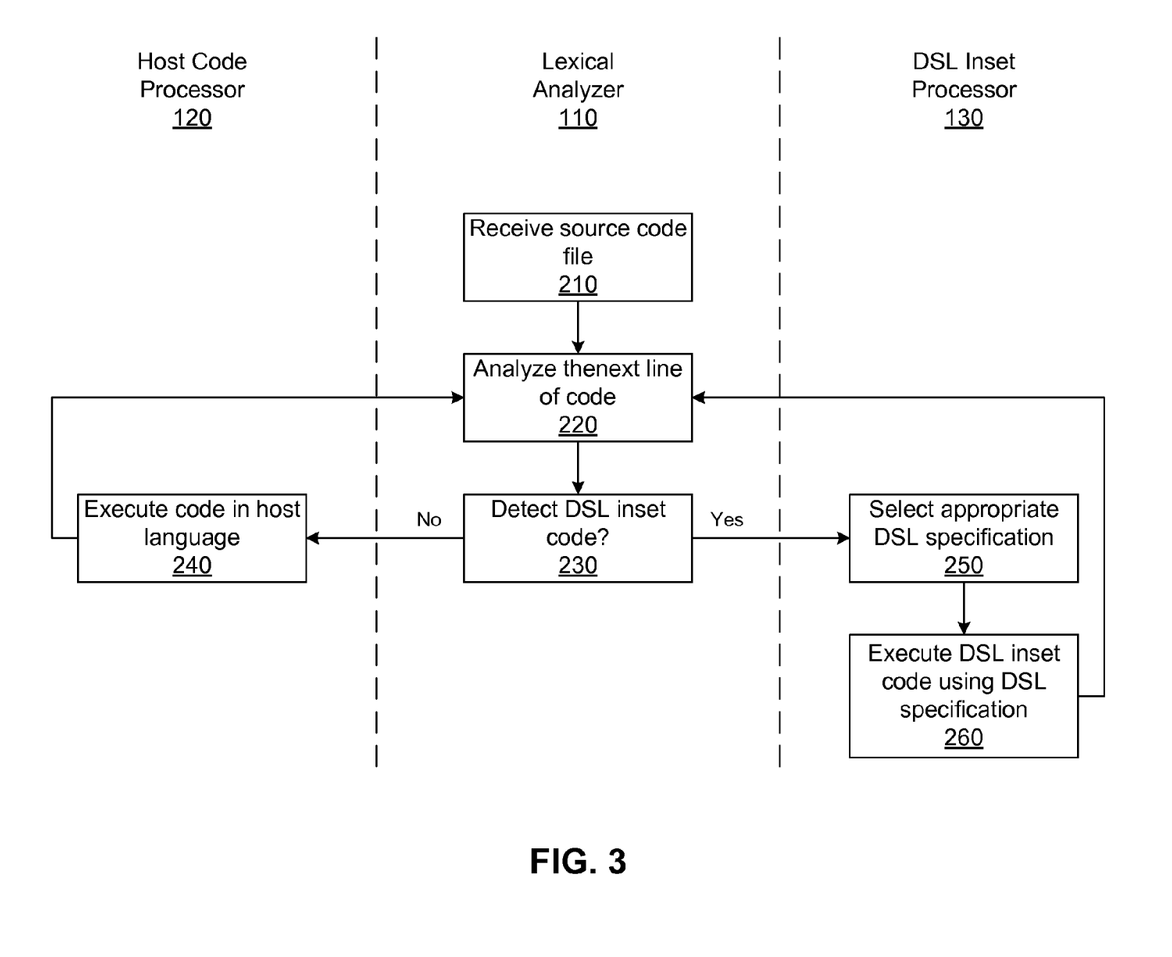
FIG. 3 is a flow chart of a method for processing code having language-level integration of multiple programming languages, in accordance with an embodiment of the invention.

As described above, for example in connection with step 203 in FIG. 3, one of the functions of a system for processing language-level integrated code involves identifying which parts in the source code need to be processed as constructs in a DSL specification and which parts contain the remaining code in the host language. The instructions for performing this detection may be integrated as an extension to a standard lexical analyzer 110, or lexical analyzer, of the host language. Various techniques may be used to detect a DSL inset in the program code.

A number of different techniques may be used to indicate the presence of a DSL inset in the source code. Preferably, the technique does not conflict with the syntax of the host language, so the technique used may depend on the host language selected. In one embodiment, where Ruby is used as the host language, a DSL inset may be indicated in the program code using the following notation:

\('dsl_string( )')

where 'dsl_string( )' is the DSL inset written as a text string between an opening bracket and a corresponding closing bracket. Alternatively or additionally, other bracketing symbols may be used, such as '(', '{', '[', or '<'. This notation is well-suited for the Ruby language because it does not create any ambiguities for standard lexical analysis of Ruby code. In the standard Ruby implementation, the backslash symbol is used for joining two lines in the source code to make them appear as one line for the Ruby engine. Accordingly, for standard Ruby code the symbol following the backslash symbol should always be the newline character. In all other cases, the standard Ruby implementation issues a syntax error. This allows for the standard parser to be extended to detect a DSL inset rather than issue the syntax error.

In one embodiment, this is implemented by causing lexical analyzer 110 to perform additional checks for opening bracket symbols for any character that follows a backslash and occurs before a newline symbol. Once an opening bracket symbol is found, a subroutine is invoked to obtain the DSL inset (i.e., 'dsl_string( )'), which is terminated by a corresponding closing bracket. In one example, this subroutine uses a simple algorithm that reads one token of the source code after the other and increments a counter whenever the opening bracket is found and decrements it in case the closing bracket is found. When the closing bracket is found and the counter is zero, the DSL inset has been fully read, so the subroutine returns this text string. This DSL inset text string, 'dsl_string( )', is then passed to the DSL inset processor 130 for execution, as described in connection with the method of FIG. 3.

In an alternative embodiment, a DSL inset can be marked in the code manually using an "escape token," which is an explicit token defined by the programmer to indicate the presence of a DSL inset in the program code. The use of escape-tokens may beneficially make the integration of DSL insets into program code in the host language more transparent to the end-user. In one embodiment, one or more escape tokens are declared before they are used in the source code. The declaration of escape-tokens may be performed as part of a DSL definition, described in more detail below. In one example, an escape token may be declared in a line of the source code as follows:

\ identifier terminating_symbol where the 'identifier' is a string consisting of letters and/or digits and the 'terminating_symbol' can be any non-word symbol (e.g., '.', ';', ':', or the like). Once an identifier and a terminating-symbol have been declared as an escape token as explained above, a DSL inset can be specified anywhere in the source code using the following format:

identifier 'dsl_string( )' terminating_symbol where 'dsl_string( )' is a sequence of characters for the DSL inset and does not contain the terminating symbol. The following two lines illustrate an example of the use of escape tokens for indicating a DSL inset in the program code:

```
#\ SQL ;
SQL SELECT * FROM column1;
``` where the first line declares the identifier "SQL" and terminating symbol ";" and the second line uses the escape token to write SQL code as a DSL inset in source code that uses Ruby as the host language.

The implementation of escape tokens may require more effort than the other embodiment using a backslash and brackets to identify DSL insets, since the escape token identifiers have to be registered with the lexical analyzer 110 before the code containing the DSL inset can be processed. For this reason, the source code files may be preprocessed by a script that collects all lines containing escape token declarations and registers them for the lexical analyzer 110. With the escape tokens known, the lexical analyzer 110 is extended by adding a piece of code that checks whether a detected identifier is one of the registered escape token identifiers. If it is, the lexical analyzer 110 then reads and collects in a string all characters until the registered termination symbol appears. This DSL inset text string, 'dsl_string( )', is then passed to the DSL inset processor 130 for execution, as described in connection with the method of FIG. 3.

As described above, for example in connection with steps 250 and 260 in FIG. 3, once a DSL inset is detected by the lexical analyzer 110, it is then passed to the DSL inset processor 130 to be processed using a DSL specification 140. If there are multiple DSL specifications, the DSL inset processor 130 uses the DSL specification 140 that is associated with the language in which this DSL inset was written is used.

In one embodiment, the lexical analyzer 110 passes a string representing the DSL inset as well as the binding context in which the Ruby expressions occurring in the DSL specification should be evaluated. A binding context may comprise a snapshot of the current state of the artifacts that the runtime logic uses to do evaluations. For instance, the binding context within a function may include the local variables of that function and the function parameters, while outside that function those artifacts would be unknown. A snapshot of the binding context taken inside a function would capture these local variables and parameters, makes it possible to evaluate expressions outside the scope of the function as if the evaluation would have been taken place inside the function.

Passing the binding context thus allows the DSL specification to evaluate the DSL inset code in a manner that is consistent with the context in which that code is present in the host language. Alternatively, rather than passing the DSL inset as a text string, the lexical analyzer 110 may pass the DSL inset inside a file. In such a case, the lexical analyzer 110 passes the filename of the file in place of the DSL inset text string. In an embodiment that allows for either method, the lexical analyzer may further pass a flag that indicates whether the text string is a DSL inset or the name of a file that contains the DSL inset.

Figure 4:
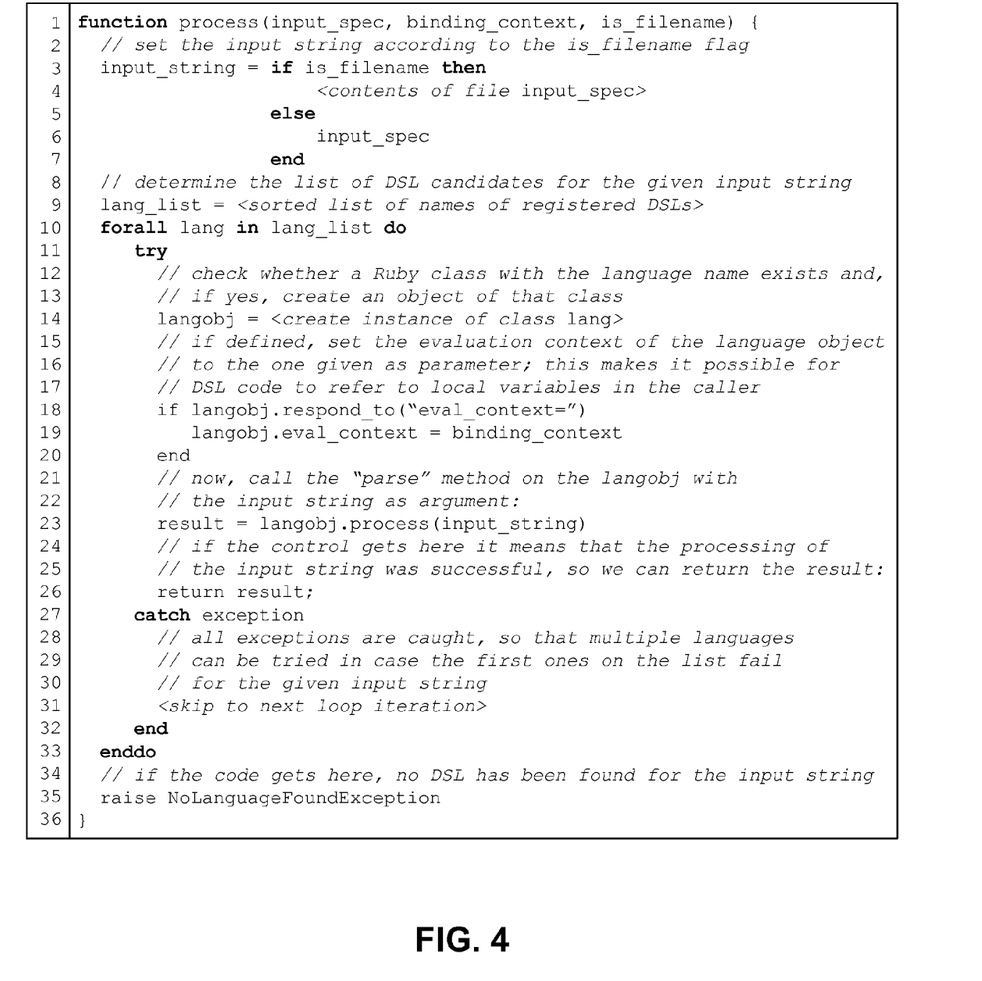
FIG. 4 shows pseudo code that describes a process for processing a DSL inset, in accordance with an embodiment of the invention.

Once the DSL inset processor 130 receives the DSL inset code, it processes that code in accordance with the appropriate DSL specification. FIG. 4 shows example pseudo code that describes the processing of a DSL inset by the DSL inset processor 130 (e.g., steps 250 and 260 in FIG. 3), in accordance with an embodiment that allows for passing of the DSL inset as either a text string or the content of a file.

In the process outlined by this pseudo code, lines 3-7 of the code set the input string according to the 'is_filename' flag, which indicates whether the passed string is a filename or the DSL inset itself. Line 9 contains a selection of the language selection list, 'lang_list', which contains an ordered list of DSL specification names that are candidate languages for the given DSL inset. This list may be derived from a language list that may be manipulated at the user-level. In addition, a DSL specification name is added to the front of this language selection list when in the source code the statement:

use dslname is specified. When it appears in the source code, this statement registers the given DSL specification name, indicated by 'dslname', in the system if it is not registered already, and it moves that DSL specification name to the front of the language selection list regardless of whether the DSL specification has been registered. The ordering of the DSL specification names in the language selection list may be important if the algorithm is designed to use the first DSL specification that is appropriate for the DSL inset. For example, if a DSL A occurs before a DSL B in the language selection list, and the DSL inset would be accepted by both DSLs A and B, DSL A would be selected to process the DSL inset instead of DSL B because it occurs higher in the language selection list. As described below, this is how the algorithm shown in FIG. 4 operates. This way of determining which DSL specification to use provides a mechanism for the user to optimize the runtime behavior of the process method, by placing the most frequently used DSLs in front of the less frequently used ones in the language selection list, thereby minimizing traversal of that list.

Lines 10-33 contain a DSL iteration loop that runs through each DSL specification contained in the language selection list. In each iteration of the loop, the variable 'lang' stands for the current candidate DSL specification. Line 14 creates a Ruby object of the class with the name of the candidate DSL Specification. If no such class exists, then the Ruby runtime will issue an exception that is caught by the catch clause in lines 27-32, causing the process to move to the next iteration of the loop. If the DSL class does exist, then the process attempts in lines 18-20 to set the evaluation context for that class. By convention, the attribute name for the evaluation context is 'eval_context'. The Ruby method 'respond_to?' queries the object for this attribute, and the evaluation context is set only if the attribute exists. Line 23 contains the actual call to the 'parse' method of the DSL specification, which triggers the processing of the input string by that DSL. If the 'parse' method returns without an error, then the result constitutes the overall result of the process method, and no further processing is done because a DSL has been found for the given input string and the processing was successful. In all other cases, the DSL 'parse' method will raise an exception that is caught by the catch-clause in lines 27-32. If after iterating through all language candidates no DSL specification is found that could successfully process the given DSL inset string, a corresponding exception is raised in line 35.

DSL Specifications

The DSL specification enables a seamless interface between the host language and the one or more DSLs that are used in the programming framework. In one embodiment, each DSL specification defines a parse method that takes a string as an argument, where the string is a DSL inset to be processed. As described above, the parse method performs the instructions that are associated with the DSL inset text as defined in the DSL specification. In one embodiment, where the host language is Ruby, the parse method for each DSL specification may be defined in a Ruby class. During processing of the parse method on the DSL inset text, a failure may be signaled by raising an exception, and a successful completion may return gracefully to the caller.

In a real-world implementation of the framework described herein, where a DSL specification describes all or a substantial portion of another programming language, the DSL specification may define a full-fledged parsing method for the DSL. Such a parsing method may be generated automatically by a parser generation tool, rather than manually coded by a programmer. Automated generation of parsing methods provides a standard way to add new DSLs to the programming framework. One technique for automated generation of a DSL specification uses well known parser and lexer generation tools, provide an automated mechanism for creating source code that implements a parser and a lexer in a particular programming language. Where the host language is Ruby, for example, the parser and lexer tools used may include Rex, Racc, and ANTLR. Rex and Racc are the Ruby implementations of the popular Unix-tools, Lex and Yacc.

In one embodiment, a "learn" statement is defined for allowing a programmer to generate a new DSL specification. Using the learn statement, if the following statement is used in the source code:

learn dslname the system will look for the corresponding file (e.g., a file whose filename has 'dslname' as the base name and suffixes that correspond to the built-in parser and lexer tools). The system then creates the DSL specification by applying the lexer and parser tools to this file. During runtime, the DSL specification files may be loaded into the system and available for use at the beginning of runtime.

Figure 6:
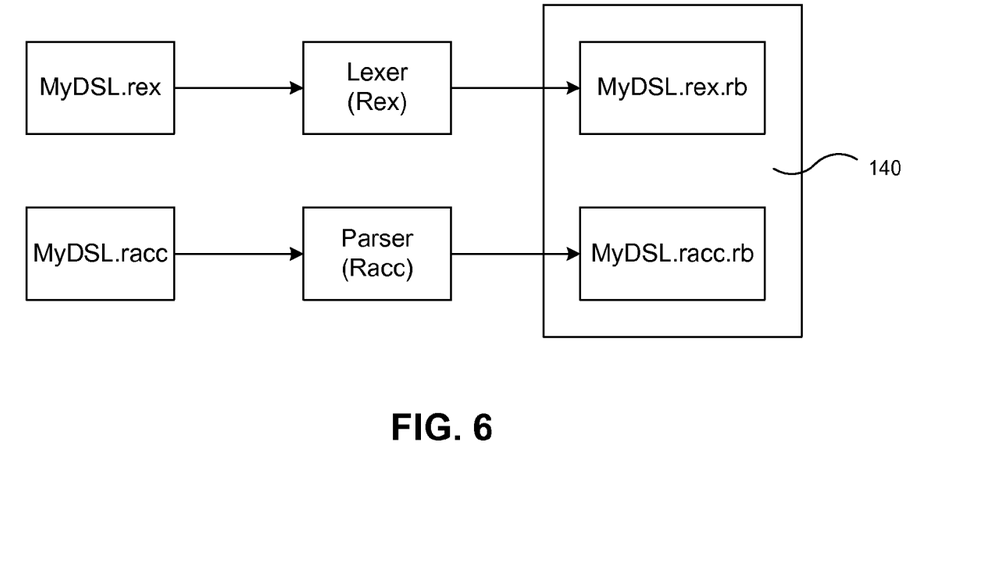
FIG. 6 is a diagram of a process for generating a DSL specification, in accordance with an embodiment of the invention.

In one example, a programmer may wish to incorporate a new DSL named "MyDSL" using the Rex and Racc tools. To do this, the programmer would use the statement "learn MyDSL" in the source code, which would cause the system to check for files named MyDSL.rex and MyDSL.racc (and possibly for all other known suffixes as well). The implementation of the learn construct would then lookup the corresponding system commands that call the tools that in turn generate code that is loaded into the system. For instance, the system commands in the above examples may be rex MyDSL.rex which generates the file MyDSL.rex.rb using the Rex tool, and racc MyDSL.racc which generates the file MyDSL.racc.rb using the Racc tool. The process for generating the DSL specification 140 for the example MyDSL language extension is illustrated in FIG. 6. As shown, the process generates two Ruby files that contain the logic for parsing a string, or DSL inset, written in the MyDSL language. Together, these files form the DSL specification 140 for the MyDSL extension of the host language.

Figure 5:
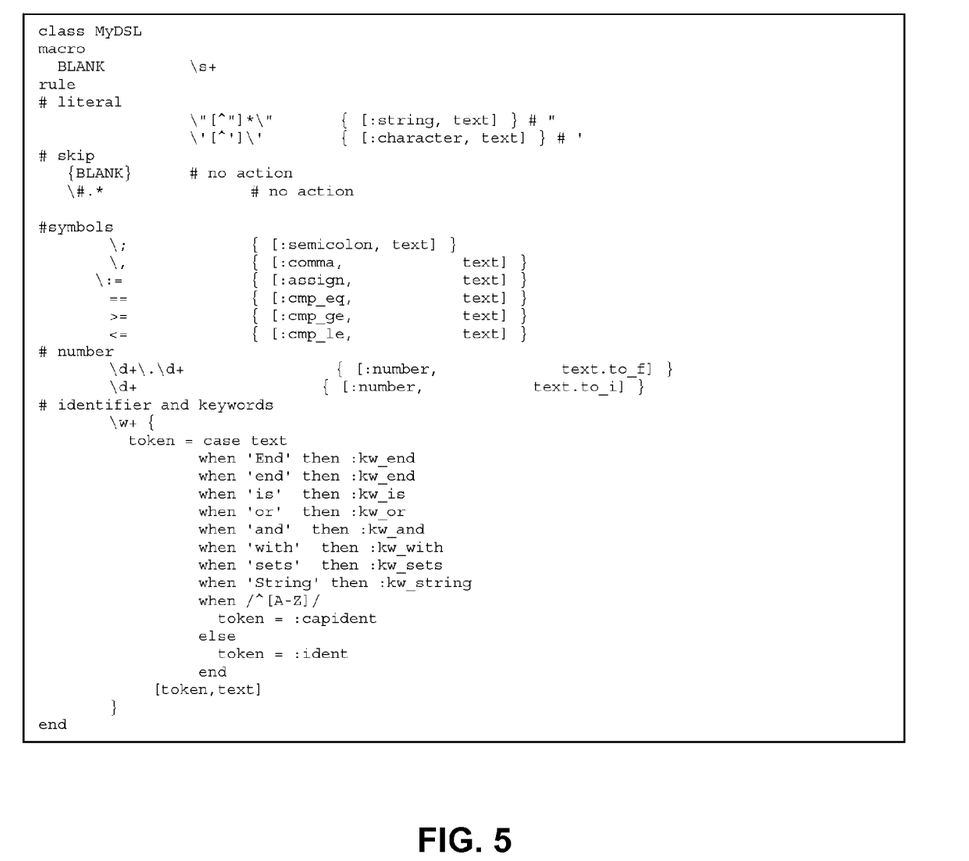
FIG. 5 shows a portion of an example DSL specification, in accordance with an embodiment of the invention.

FIG. 5 contains an excerpt of a typical content of a Lexer definition file for the Rex tool. The purpose of this file is to define tokens that are the atomic entities for the parser, since the parser does not deal with single characters from the input string but rather with tokens that are strings of subsequent characters in the input string constructed according to the rules of the Lexer definition file. The parser file contains grammar rules that define the syntax of the DSL. A grammar contains a list of non-terminal symbol definitions, one of which is marked as the starting non-terminal symbol. The format of such a definition may contain several alternative rules for the non-terminal symbol, and is as follows:

```
Nonterminal-symbol
: <sequence of nonterminal symbols and tokens>
{
   actions
}
| <sequence of nonterminal symbols and tokens>
{
   actions
}
...
```

For example, to specify a comma-separated list of identifiers in a non-terminal symbol ident_list, the following specification could be used:

```
ident_list
: ident
{
   result = [val[0]]
}
```

-continued

```
| ident comma ident_list
{
   result = [val[0]] + val[2]
}
```

The first rule, describes the "base case," where the identifier list contains only one element. The action sets the result of that rule to the value of the first element in the sequence of non-terminal symbols and tokens of the rule (indexing starts from 0). The variable names "result" for the result of a grammar rule and "val" for the array of elements in the rule are a convention of the Racc tool used in this illustration. The second rule for the "ident_list" covers the continuation case, where an identifier is followed by a list of identifiers. The result of this rule is the concatenation of the results of the single identifier and the list of the identifiers. Assuming this would be the only grammar rule in MyDSL, an ident_list would be the entry point for the DSL, and MyDSL would only be capable of parsing a comma-separated list of identifiers like: "a,b,c,d". The parse method in this case would run without raising an exception and return the Ruby-array ["a", "b","c","d"], according to the actions attached to the above rules. In practice, a DSL would likely contain many more of these kinds of rules, but the format for each of these rules and the way the return value is computed using the rule actions may be the same.

In one embodiment, one DSL specification may be defined in terms of another DSL, rather than purely in terms of the host language. This hierarchical definition of DSL specifications is made possible because the rule actions need not be restricted, so a programmer may use any available expression (including anything in the host language or any loaded DSLs) to define a new DSL specification. In other words, the DSL definition files may themselves contain DSL insets for DSLs that have been loading into the system's memory.

Figure 7:
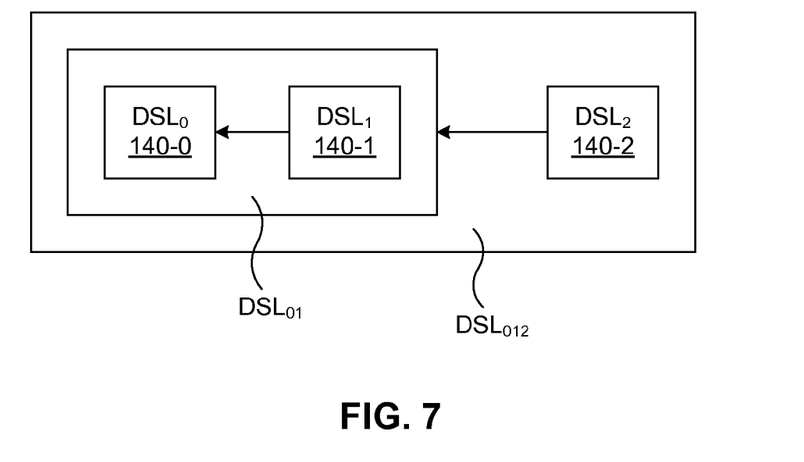
FIG. 7 is a diagram of a hierarchical integration of multiple DSLs, in accordance with an embodiment of the invention.

An example of a hierarchical set of DSLs is illustrated in FIG. 7. In this example, $DSL_1$ is defined using constructs from the host language, $DSL_0$, resulting in an extended language, $DSL_{01}$. Once the host language has been extended by the first $DSL_1$, the second $DSL_2$ can be defined using both the host language and $DSL_1$. This would be accomplished by using a DSL inset for $DSL_1$ in the action parts of a DSL specification for $DSL_2$. The result is a "lower-level" DSL that can be used to implement a "higher-level" DSL. Through this technique, DSL hierarchies can be built up and DSLs that have been defined before can be leveraged for the definition of new DSLs. At runtime, during the processing of a higher-level DSL, the control would be passed temporarily to the lower-level DSL. Just one example application for this type of hierarchical DSL-level interaction is the use of low-level database access DSLs for the persistence layer in a higher-level "business objects" DSL.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art.

These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, or any type of media suitable for storing electronic instructions, which can be coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded onto a carrier wave and transmitted over a tangible medium according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for executing program code, the method comprising:
   receiving a source code file that includes computer code in a host language integrated with inset computer code in a domain specific language, the domain specific language being different from the host language;
   reading the source code file;
   responsive to reading computer code in the host language, invoking a set of computing instructions indicated by the computer code in accordance with the host language by interpreting a computing instruction indicated by the computer code as an operation in the host language; and
   responsive to reading inset computer code in the domain specific language, invoking a set of computing instructions indicated by the inset computer code in accordance with the domain specific language by performing operations including:
      selecting a domain specific language specification for the inset computer code, the domain specific language specification including instructions written in the host language for executing the inset computer code by relating tokens that include strings of characters from the domain specific language to corresponding tokens that include strings of characters from the host language and relating at least one grammatical rule for operations on tokens from the domain specific language to at least one corresponding grammatical rule for operations on tokens from the host language, and
      using the domain specific language specification to process the inset computer code.

2. The method of claim 1, further comprising:
   detecting the inset computer code using a predefined escape token.

3. The method of claim 1, wherein invoking the set of computing instructions indicated by the inset computer code in accordance with the domain specific language comprises:
   passing the inset computer code to a domain specific language inset processor for execution thereby; and
   passing a binding context to the domain specific language inset processor for the execution of the inset computer code, the binding context describing a memory state of a computing system when the inset computer code is read, and the binding context including values of variables in the host language corresponding to the invocation of the set of computing instructions indicated by the computer code.

4. The method of claim 1, wherein the host language is an interpreted language, and a line of the inset computer code in the domain specific language is interpreted as a result of the processing based on the instructions written in the host language from the domain specific language specification.

5. The method of claim 1, wherein the host language is Ruby.

6. The method of claim 1, wherein the corresponding tokens and the at least one corresponding grammatical rule are used to interpret the inset computer code as at least one result of the processing based on the instructions written in the host language from the domain specific language specification.

7. The method of claim 1, wherein the inset computer code is interpreted as at least one result of the processing based on the instructions written in the host language from the domain specific language specification.

8. A computer program product for executing program code, the computer program product comprising a computer-readable storage medium including computer program code that comprises:
   a host language processor configured to execute program code in a host language by interpreting a line of program code in the host language as an operation in the host language;
   a domain specific language inset processor configured to execute program code in a domain specific language by performing operations including:
      selecting a domain specific language specification for domain specific language, the domain specific language specification including instructions written in the host language for executing the program code in the domain specific language by relating tokens that include strings of characters from the domain specific language to corresponding tokens that include strings of characters from the host language and relating at least one grammatical rule for operations on tokens from the domain specific language to at least one corresponding grammatical rule for operations on tokens from the host language, the domain specific language being different from the host language, and using the domain specific language specification to process the inset computer code; and a lexical analyzer configured to receive a source code file that contains includes computer code in the host language integrated with inset computer code in the domain specific language, the lexical analyzer being further configured to pass program code in the host language to the host language processor and pass inset computer code in the domain specific language to the domain specific language inset processor.

9. The computer program product of claim 8, wherein the lexical analyzer is further configured to detect the inset computer code using a predefined escape token.

10. The computer program product of claim 8, wherein the domain specific language inset processor is configured to execute program code in a domain specific language by:
   passing the inset computer code to a domain specific language inset processor for execution thereby; and
   passing a binding context to the domain specific language inset processor for the execution of the inset computer code, the binding context describing a memory state of a computing system when the inset computer code is read, and the binding context including values of variables in the host language corresponding to executing the computer code in the host language.

11. The computer program product of claim 8, wherein the host language is an interpreted language, and a line of the inset computer code in the domain specific language is interpreted as a result of the processing based on the instructions written in the host language from the domain specific language specification.

12. The computer program product of claim 8, wherein the host language is Ruby.

13. A computer program product for executing program code, the computer program product comprising a computer-readable storage medium including computer program code for:
   receiving a source code file that includes computer code in a host language integrated with inset computer code in a domain specific language, the domain specific language being different from the host language;
   reading the source code file;
   responsive to reading computer code in the host language, invoking a set of computing instructions indicated by the computer code in accordance with the host language by interpreting a computing instruction indicated by the computer code as an operation in the host language; and
   responsive to reading inset computer code in the domain specific language, invoking a set of computing instructions indicated by the inset computer code in accordance with the domain specific language by performing operations including:
      selecting a domain specific language specification for the inset computer code, the domain specific language specification including instructions written in the host language for executing the inset computer code by relating tokens that include strings of characters from the domain specific language to corresponding tokens that include strings of characters from the host language and relating at least one grammatical rule for operations on tokens from the domain specific language to at least one corresponding grammatical rule for operations on tokens from the host language, and
      using the domain specific language specification to process the inset computer code.

14. The computer program product of claim 13, further comprising computer program code for:
   detecting the inset computer code using a predefined escape token in the host language.

15. The computer program product of claim 13, wherein invoking the set of computing instructions indicated by the inset computer code in accordance with the domain specific language comprises:
   passing the inset computer code to a domain specific language inset processor for execution thereby; and
   passing a binding context to the domain specific language inset processor for the execution of the inset computer code, the binding context describing a memory state of a computing system when the inset computer code is read, and the binding context including values of variables in the host language corresponding to the invocation of the set of computing instructions indicated by the computer code.

16. The computer program product of claim 13, wherein the host language is an interpreted language, and a line of the inset computer code in the domain specific language is interpreted as a result of the processing based on the instructions written in the host language from the domain specific language specification.

17. The computer program product of claim 13, wherein the host language is Ruby.

* * * * *